(12) United States Patent
Kwan et al.

(10) Patent No.: US 8,432,466 B2
(45) Date of Patent: Apr. 30, 2013

(54) MULTIPLE IMAGE HIGH DYNAMIC RANGE IMAGING FROM A SINGLE SENSOR ARRAY

(75) Inventors: Derek Kwan, Markham (CA); Angela Y. C. Lee, Newmarket (CA)

(73) Assignee: International Business Machines Corporation, Armonk, NY (US)

(*) Notice: Subject to any disclaimer, the term of this patent is extended or adjusted under 35 U.S.C. 154(b) by 27 days.

(21) Appl. No.: 13/248,067

(22) Filed: Sep. 29, 2011

(65) Prior Publication Data

US 2013/0083226 A1    Apr. 4, 2013

(51) Int. Cl.
*H04N 9/083* (2006.01)
*H04N 3/14* (2006.01)
*H04N 5/335* (2006.01)
*H04N 9/04* (2006.01)

(52) U.S. Cl.
USPC ........... 348/277; 348/278; 348/279; 348/280; 348/281

(58) Field of Classification Search .................. 348/360, 348/362, 367, 273, 276–279, 281, 237
See application file for complete search history.

(56) References Cited

U.S. PATENT DOCUMENTS

| | | | |
|---|---|---|---|
| 4,214,264 A | | 7/1980 | Hayward et al. |
| 6,690,422 B1* | | 2/2004 | Daly et al. ..................... 348/273 |
| 6,771,312 B2 | | 8/2004 | Kamishima et al. |
| 6,803,955 B1* | | 10/2004 | Yosida ........................... 348/272 |
| 7,714,903 B2 | | 5/2010 | Pertsel et al. |
| 2002/0163583 A1* | | 11/2002 | Jones ............................ 348/272 |
| 2003/0183746 A1 | | 10/2003 | Chen |
| 2005/0057670 A1 | | 3/2005 | Tull et al. |
| 2005/0212934 A1* | | 9/2005 | Hoshuyama .................. 348/272 |
| 2005/0253937 A1 | | 11/2005 | Moholt et al. |
| 2005/0275747 A1 | | 12/2005 | Nayar et al. |
| 2006/0017829 A1* | | 1/2006 | Gallagher ..................... 348/276 |
| 2007/0296840 A1* | | 12/2007 | Takada et al. ................. 348/272 |
| 2009/0290052 A1* | | 11/2009 | Liu et al. ...................... 348/277 |
| 2010/0053346 A1* | | 3/2010 | Mitsunaga ................. 348/208.6 |
| 2010/0091124 A1* | | 4/2010 | Hablutzel ................. 348/208.12 |
| 2010/0231755 A1* | | 9/2010 | Sekine ......................... 348/234 |
| 2011/0080636 A1 | | 4/2011 | Nakanishi |
| 2011/0211099 A1* | | 9/2011 | Nayar et al. .................. 348/278 |

FOREIGN PATENT DOCUMENTS

KR    1020090004310 A1    12/2009

* cited by examiner

*Primary Examiner* — Sinh Tran
*Assistant Examiner* — Paul Berardesca
(74) *Attorney, Agent, or Firm* — Patrick J. Daugherty; Driggs, Hogg, Daugherty & Del Zoppo Co., LPA

(57) ABSTRACT

A single array of image sensors is used to obtain a plurality of different images at different levels of admitted exposure light from a common source level of exposure light. More particularly, first and second matrices of light-admitting elements are deployed in a single camera and disposed relative to focal lens light in front of corresponding first and second matrices of light-sensitive image sensors that are arrayed in a singular focal plane array in the camera and react equally to equal levels of color image information. The respective matrices of light-admitting elements transmit color image information from exposed focal lens light at different levels of brightness to their corresponding matrices of light-sensitive image sensors, wherein first and second images are acquired at the respective different levels of brightness from the respective matrices of the image sensors, and pixel data from the images combined to produce an HDR image.

17 Claims, 4 Drawing Sheets

MULTIPLE IMAGE HIGH DYNAMIC RANGE IMAGING FROM A SINGLE SENSOR ARRAY

TECHNICAL FIELD

The present invention relates to creating High Dynamic Range (HDR) images from multiple individual images of a same scene that are each acquired through different levels of admitted light.

BACKGROUND

In HDR imaging, a dynamic range generally refers to a range of a plurality of independent, different lighting, exposure or brightness levels that are used to create respective images (or image information data sets) of a particular scene, wherein the different images/data are combined or otherwise used together to create a single HDR image, for example through use of software applications. This allows overexposed areas or underexposed areas in any given picture region in any given image to be replaced by image data from another image taken at a different level of light exposure, thereby generating an image over a range of the different lighting, exposure or brightness levels.

In HDR photography images with different lighting, exposure or brightness levels are conventionally obtained through varying the respective focal-stop ("f-stop") values of the lens aperture of a camera used to acquire each of the images. The f-stop value is the focal length of the lens divided by the diameter of its opening, and is conventionally chosen from a graduated scale wherein each consecutive f-stop halves the opening of the previous value, and thus lower f-stop values admit more light through the lens to an image sensor, for example film material in analog photography, or charge-coupled device (CCD) or composite metal oxide semiconductor (CMOS) sensor devices in digital photography. In one example an 80 mm lens with an f-stop set to f8 has an opening diameter equivalent to 10 mm, wherein changing the f-stop to f16 creates a diameter of 5 mm. However, the f-stop setting may also determine the "depth of field" of the acquired image data; how much of image in front of and behind a subject in focus will also be in focus, with smaller f-stops providing images with relatively larger depths of field as compared to images acquired by the same lens at larger f-stop settings. Therefore, varying admitted light levels through varying f-stop settings of a lens to acquire multiple images of a scene for HDR present many problems; such images may have different respective depths of field, with some foreground and background elements out-of-focus in the larger f-stop images.

BRIEF SUMMARY

In one embodiment of the present invention, a method for using a single array of image sensors to obtain a plurality of different images at different levels of admitted exposure light from a common source level of exposure light includes exposing for a exposure time period first and second matrices of light-admitting elements deployed in a single camera to light from a scene image from a focal lens of the camera. Each of the matrices of light-admitting elements are disposed relative to the focal lens light in front of corresponding matrices of light-sensitive image sensors that are arrayed in a singular focal plane array in the camera, wherein the image sensors in each of the first and second matrices react equally to equal levels of color image information in the exposed focal lens light. The first matrix of light-admitting elements transmits the color image information from the exposed focal lens light to the corresponding first matrix of light-sensitive image sensors at a first level of brightness of the exposed light during the exposure time period, wherein the second matrix of the light-admitting elements transmits the color image information from the scene image to each of its corresponding second matrix of light-sensitive image sensors at a different, second level of brightness. First and second images are thus acquired at the respective different levels of brightness from the respective matrices of light-sensitive image sensors, and pixel data from the acquired images combined to produce a high dynamic range image of the scene.

In another embodiment, a system has a processing unit, computer readable memory and a computer readable storage medium device with program instructions, wherein the processing unit, when executing the stored program instructions, acquires a first image that has a first level of brightness from color image information transmitted to a first matrix of light-sensitive image sensors in a camera by a corresponding first matrix of light-admitting elements during an exposure time period from exposed focal lens light from a scene image, wherein each of the first matrix light-admitting elements are disposed relative to the focal lens light in front of corresponding ones of the first matrix of light-sensitive image sensors in the camera. The processing unit further acquires a second image at a second level of brightness from the color image information as transmitted to a second matrix of the light-sensitive image sensors that are arrayed in a singular focal plane array with the first matrix sensors in the camera, wherein the second level of brightness is transmitted by corresponding ones of a second matrix of light-admitting elements. The light-sensitive image sensors in the first and second matrices react equally to equal levels of color image information in the exposed focal lens light. Pixel data from the acquired first and second images of different levels of brightness are combined to produce a high dynamic range image of the scene.

In another embodiment, an article of manufacture has a computer readable storage medium device with computer readable program code embodied therewith, the computer readable program code comprising instructions that, when executed by a computer processor, cause the computer processor to acquire first and second images at different levels of brightness from color image information transmitted to respective first and second matrices of light-sensitive image sensors in a camera by a corresponding first and second matrices of light-admitting elements during an exposure time period from exposed focal lens light from a scene image, wherein the light-admitting elements are disposed relative to the focal lens light in front of corresponding ones of the light-sensitive image sensors in the camera. The light-sensitive image sensors in the first and second matrices react equally to equal levels of color image information in the exposed focal lens light. Pixel data from the acquired first and second images of different levels of brightness are combined to produce a high dynamic range image of the scene.

In another embodiment, a method for providing a service for using a single array of image sensors to obtain a plurality of different images at different levels of admitted exposure light from a common source level of exposure light includes providing one or more articles, including an image acquirer that acquires first and second images at different levels of brightness from color image information transmitted to respective first and second matrices of light-sensitive image sensors in a camera by corresponding first and second matrices of light-admitting elements during an exposure time period from exposed focal lens light from a scene image, wherein the light-admitting elements are disposed relative to the focal lens light in front of corresponding ones of the light-sensitive image sensors in the camera. The light-sensitive image sensors in the first and second matrices react equally to equal levels of color image information in the exposed focal lens light. A high dynamic range image generator is provided that combines pixel data from the acquired first and second images to produce a high dynamic range image of the scene.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
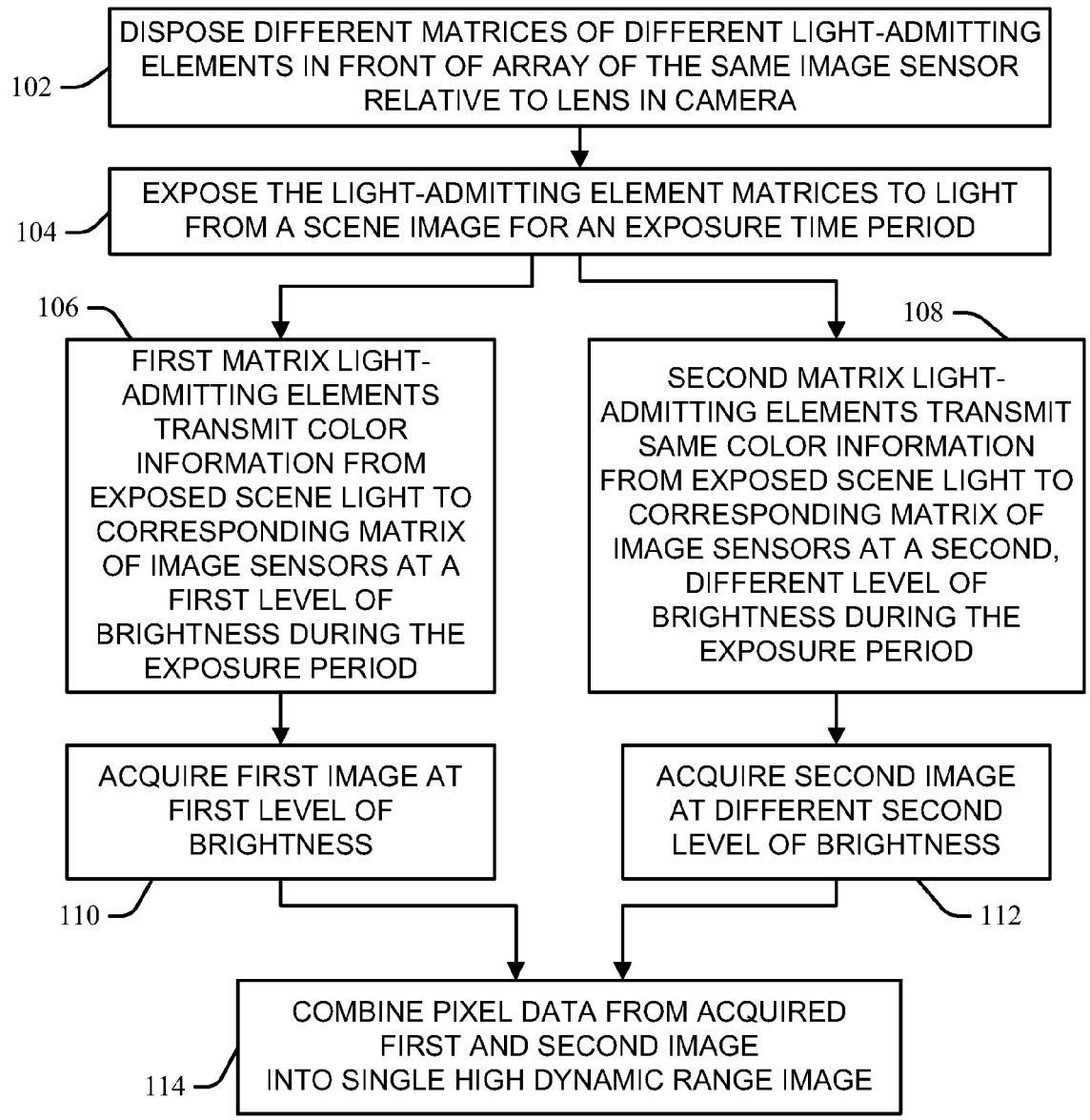
FIG. 1 is a flow chart illustration of an embodiment of a method or system for using a single array of image sensors to obtain a plurality of different images at different levels of admitted exposure light from a common source level of exposure light according to the present invention.

The drawings are not necessarily to scale. The drawings are merely schematic representations, not intended to portray specific parameters of the invention. The drawings are intended to depict only typical embodiments of the invention and, therefore, should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, an embodiment of a method, process or system for using a single array of image sensors to obtain a plurality of different images at different levels of admitted exposure light from a common source level of exposure light according to the present invention is illustrated. More particularly, at 102 first and second matrices of light-admitting elements that are structurally distinct one from another and are disposed in a single camera relative to a focal lens in front of respective, corresponding first and second matrices of light-sensitive image sensors defined within a common array in a singular focal plane array of the camera. Each of the image sensors is in circuit communication with a processing unit (for example, a digital signal processor (DSP) or other processing unit or article), to thereby provide image data in unison with the others within their respective matrices to enable the processing unit to form discrete scene images from each of the first and second matrices of the image sensors. The distinct light-admitting elements may be active structures in circuit communication with others within their respective common matrices to transmit the same level or amount of light in unison with respect to the associated sensor arrays (for example, shutters active mechanically, electrically, chemically, etc.), or they may be passive structures (for example, filters, masks, etc.). Each of the light-admitting elements admits light from a common exposure of a scene to an associated sensor element at a different level or amount of exposure relative to at least one other of the light-admitting elements in a different matrix, as is described more fully below.

At 104 the matrices of light-admitting elements are exposed for an exposure time period to light from a scene image from a focal lens. Accordingly, over this exposure time period: (1) at 106 the first matrix light-admitting elements transmit color image information from the exposed focal lens light from the scene image to each of the corresponding first matrix of light-sensitive image sensors at a first level of admitted light during the exposure time period; and (2) at 108 the second matrix light-admitting elements transmit the same color image information from the exposed focal lens light from the scene image to each of the corresponding second matrix of light-sensitive image sensors, but at a second level of brightness of admitted light that is different from the first level of admitted light brightness during the same exposure time period. Accordingly, at 110 a first image is acquired from the color image information transmitted to the first matrix of light-sensitive image sensors that has a first level of brightness, and at 112 a second image is acquired from the color image information transmitted to the second matrix of light-sensitive image sensors during the same exposure time period, wherein the second image has a second level of brightness that is different from the first level of brightness of the acquired first image.

The pixel data from these two, separate images of the same scene that comprise image information at different levels of brightness are then combined via a processing unit to produce a single high dynamic range image of the scene at 114. Thus, an HDR image of the scene is generated from two (or more) individual images that are each generated by exposing discrete arrays within the single array of image sensors to scene information light having the same point of view (the same image focused through the same lens), over common or overlapping exposure times, but wherein each is acquired from different respective levels of brightness of the admitted light. In one aspect, forming the HDR image at 114 allows overexposed areas or underexposed areas in any given picture region in any given individual image to be replaced by image data from another image with a different level of image brightness taken at a different level of light exposure, thereby generating an image over a range of the different lighting, exposure or brightness levels.

More particularly, the respective light-admitting element matrices cause the acquisition of different respective images of the scene comprising the same color image information but at different levels of admitted light during the same exposure of the scene over the same, single exposure time period. It will be understood that color information refers generically to the image information; it may be full spectrum color information or partial or hybrid spectrum information (for example, only infrared, yellow-cyan, or green sensitive, etc.), or black and white information, or any combination thereof. However the color information is defined, the respective matrices of light-sensitive image sensors acquire or are sensitive to the same color information, the light-sensitive image sensors in the first and second matrices reacting equally to equal levels of color image information in the exposed focal lens light. This enables embodiments of the present invention to be practiced with conventional arrays of light sensitive sensors, eliminating the need to utilize different types of sensors within the array, wherein multiple images may be obtained from discrete groups within the single array of image sensors through operation of a processing unit in communication with the sensors, and wherein the different light-admitting elements are instead utilized to generate a plurality of different images at different respective levels of admitted light.

Prior art methods and systems for acquiring image data for a scene at multiple different levels of admitted light may use split neutral density filters in front of a lens. For example, putting a blocking filter over a lens that only partially covers the lens to affect only a part of a scene that's overly bright may allow one exposure setting to adequately encompass a range of brightness present in the scene. However, this approach is only useful where a clearly defined edge to a brightness transition between two different lighting level areas is readily identified by the photographer (for example, a horizon line, structural edge, etc.) in order that the filters may be manually aligned. Such approaches may be cumbersome and expensive, and also slow to react to or otherwise adjust to changing light conditions.

Another prior art approach is to take multiple exposures of the same scene at different shutter speed settings with a plurality of different cameras, or with the same camera in a series of exposures. However, such approaches require that different viewpoints be aligned and exposures synchronized across multiple cameras with precision, or remained aligned over multiple times when using the same camera, and thus results are dependent upon avoiding camera movement or subject-to-object movement, or upon avoiding problems through lighting level or condition changes over the time span of acquiring a series of different images at different times. Each camera, or the same camera if used to acquire a series of shots, must remain fixed in space, for example held steady by a tripod; otherwise, the images may not align into a composite HDR image, rendering success with hand held cameras unlikely or impossible. As a result of such considerations, real-time HDR video is difficult to produce, usually requiring time lapse techniques using still image video.

In contrast, embodiments of the present invention produce HDR imaging from multiple shots of the same scene taken with respect to a common light exposure event but acquired from different respective levels of light admitted from the common exposure, therefore without the need for taking multiple shots with multiple cameras, or separate, consecutive shots with one camera, and thereby avoiding the problems noted above. Instead, a single image sensor array acquires multiple images at the same time from the same, singular exposure, each with different levels of admitted light, providing multiple images at a cost of reducing resolution compared to using all of the arrayed sensors for only one image.

Figure 2:
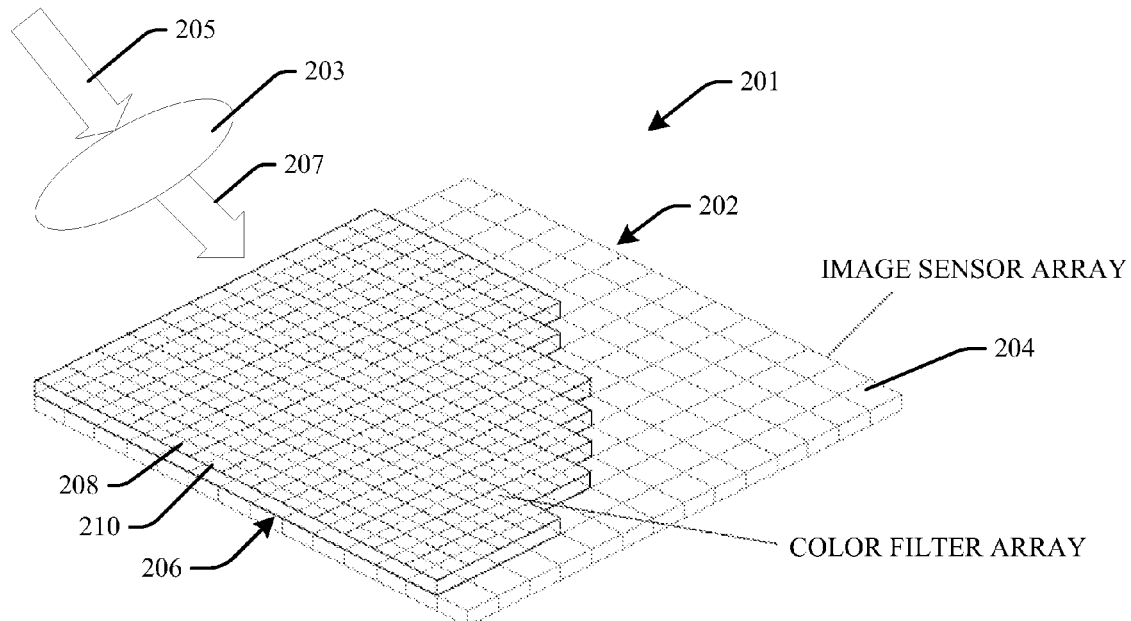
FIG. 2 is a diagrammatic illustration of a system according to embodiments of the present invention.

FIG. 2 illustrates one embodiment of a camera system 201 according to the present invention comprising an array 202 of image sensors 204 each the same or at least similar or equivalent in their sensing of or reaction to exposure light. An array 206 comprising two different interlaced matrices of different light-admitting elements 208 and 210 is disposed on top of the image sensor array 202, thus interposed between the image sensor array 202 and exposure light 207 focused upon the focal plane of the image sensor array 202 by a lens 203 from exposure light 205 from an image scene. In the present embodiment, each of the different light-admitting elements 208 and 210 are disposed on one each of the image sensors 204 in a one-to-one relationship, though in alternative embodiments the light-admitting elements 208 or 210 may be disposed in a many-to-one relationship, for example with one of the elements 208 or 210 disposed over a grouping or plurality (not shown) of more than one of the image sensors 204.

Figure 3:
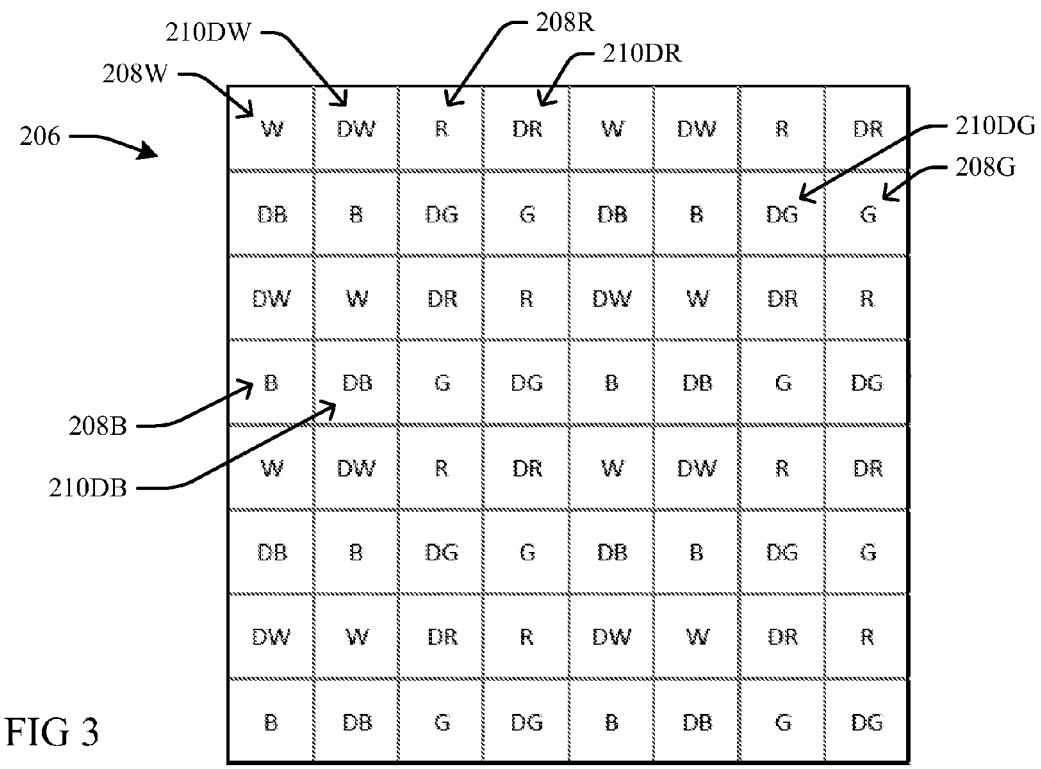
FIG. 3 is a diagrammatic illustration of matrices of different light-admitting elements according to embodiments of the present invention.

In some embodiments, the different light-admitting element matrices comprise pluralities of different transparency masking elements each having a color shade different from another, in order to generate image color information, as will be appreciated by one skilled in the art. For example, FIG. 3 is a top view of one embodiment of an array 206 of different light-admitting elements according to the present invention, wherein first matrix light-admitting elements 208 each comprise a color mask chosen from White 208W, Red 208R, Blue 208B and Green 208G mask elements, wherein data of their underlying image sensors 204 is combined into pixel color image in each underlying image sensor information to generate a first color image in response to their respective levels of admitted light for each of red, white, blue and green color pixels in a first image. The second matrix light-admitting elements 210 are chosen from correspondingly darker color masks of the same colors, thus from a Dark White 210DW, Dark Red 210DR, Dark Blue 210 DB and Dark Green 210DG mask elements, wherein data of their underlying image sensors 204 is combined into pixel color image in each underlying image sensor information to generate a second color image in response to their respective lower levels of admitted light for each of red, white, blue and green color pixels relative to the first image pixels.

More particularly, each different light-admitting element matrix may be comprised of a plurality of different masking or filtering elements with differing shades of transparency, wherein the images generated by the combination of inputs from their associated light sensors may differ with respect to respective total, composite amounts of light admitted and used for each matrix image. As the image sensors 204 underlying each of the standard and darker matrices 208/210 are structurally the same or otherwise equivalent with respect to saturation behavior from light exposure, embodiments of the present invention enable simplified sensor array 202 construction, wherein a digital signal processor (DSP) or other processing unit or article may then take the separate images from each matrix-sensor combination and combine their individual pixel data to produce an HDR image.

Figures 4A, 4B, 4C, 4D, 5:
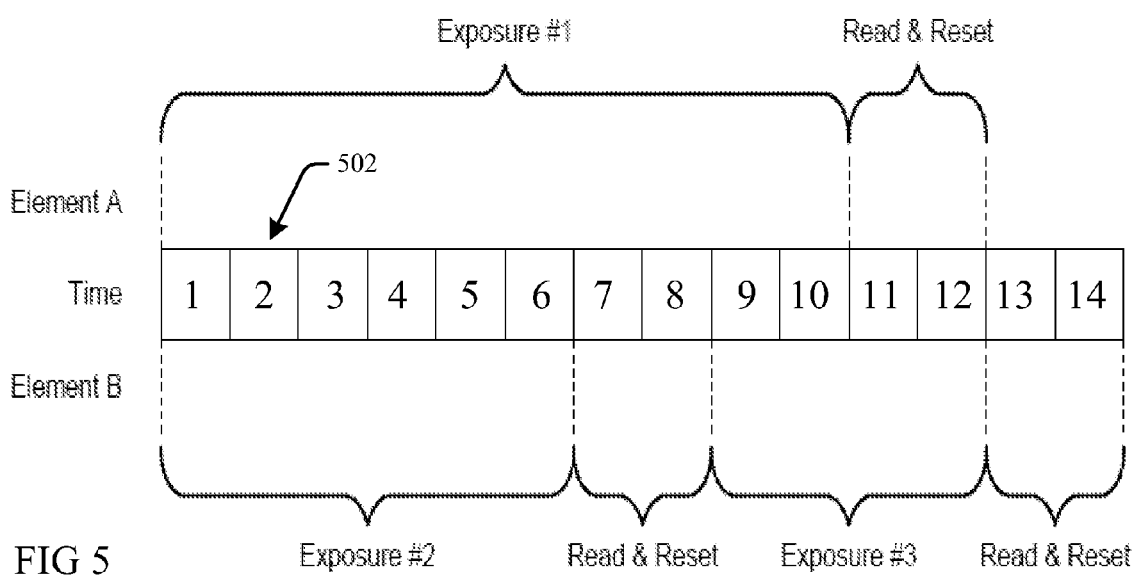
FIGS. 4A through 4D are diagrammatic illustrations of exemplary matrices of different light-admitting elements according to embodiments of the present invention.
FIG. 5 is a diagrammatic illustration of a process for acquiring a plurality of different images at different levels of admitted light over a common or overlapping exposure timeline according to embodiments of the present invention.

A variety of first and second matrix interlacing arrangements, and other matrix multiples, may be practiced. For example, FIG. 4A illustrates an example of a first matrix of first light-admitting elements 402 interleaved in an every-other relationship with each of the second light-admitting elements 404 of a second matrix. FIG. 4B illustrates another example wherein the first matrix of the first light-admitting elements 402 are instead arrayed in rows 406 that are alternated (or interleaved) in an every-other relationship with rows 408 of the second matrix light admitting elements 404.

In some embodiments, the first and second light-admitting element matrices equally split the available sensors 204 in the array 202, and thus wherein only two matrices are used, each may produce their respective first and second images at half the total resolution of the aggregate of the image sensor array 202. However, other distributions may be practiced. FIG. 4C illustrates one example of a three-to-one relationship of the first matrix light-admitting elements 402 to the second matrix light-admitting elements 404, wherein the more numerous sensors associated with each of the first matrix light-admitting elements 402 comprise 75% of the available sensors 204 in the array 202 and the sensors 204 associated therewith provide three-times the resolution of the image provided by with the sensors 204 associated with the less-numerous second matrix light-admitting elements 404, which comprise only 25% of the total available sensors 204. Moreover, more than two separate matrices may be practiced, and thereby to generate more than two images during a same exposure, provided that acceptable resolution may be achieved in each of, or in at least one of, the produced images. For example, FIG. 4D illustrates an example of the first and second matrix light-admitting elements 402 and 404 interleaved in an every-other relationship with the light-admitting elements 410 labeled as "C" of a third matrix, each of the three matrices aligning with 33% of available arrayed image sensors in a one-to-one relationship, wherein three images may be acquired from one exposure. It will be appreciated that still other distributions of three or more matrices may be practiced, for example 50%-25%-25% and 40%-40%-20% with three matrices, or 25%-25%-25%-25% with respect to four matrices to acquire four images from one exposure, and still other arrangements may be practiced.

The multiple and substantially simultaneously acquired images described thus far are appropriate for use with HDR video, as each frame may be comprised from the two or more images acquired over the same common exposure time, but with different amounts of light admitted to an underlying sensor over that same time period. Where each image is taken over the exact same time frame from the same exact perspective focused on the common focal plane defined by the composite sensor array 202, they will each record the same object position of a moving object over time, for example between subsequent exposures. Thus, multiple raw images are created each that capture substantially the same movement over time of an object within the scene, and also experiencing the same change in any lighting levels over the time of exposure.

In other embodiments of the present invention, the different light-admitting elements within the different matrices may be active shutter elements that open for different individual exposure times to thereby admit different amounts of the common exposure light on their associated sensors as a function of their different individual open times. Thus, a first matrix of shutters may open for shorter times to achieve a first matrix captured image at a lower admitted-light level than a second image captured by a second matrix of shutters opened for a longer exposure time. Instead of creating a global shutter per image sensor, more than one shutter interlaced between pixels may be provided. The shutter elements may be provided by a variety of mechanical, electrical, chemical and selectively-energized structures, or any other type of shutter mechanism that is controllable in synchronization with a plurality of a subset of the total shutters provided.

In some embodiments, a first matrix of shorter-timed light-admitting shutter elements may be used to acquire two images over a specified total exposure time frame used to capture another image by a second matrix of shutters opened longer during the specified total exposure time frame. Thus, two matrices may acquire three total images, each at half-resolution of a total sensor array, over a specified exposure time period, albeit generated in response to different levels of admitted light as a function of the respective shutter times. FIG. 5 illustrates one example of a timeline 502 of such an arrangement. An "Element A" shutter of a first light-admitting matrix remains open and thereby exposing an underlying image sensor 204 cell over an "Exposure #1" time comprising ten time units (1 through 10), wherein the next two time units (11 and 12) are used for a DSP or other article to read the image data from and reset the underlying image sensor 204 cell by purging the cell electronically. Over the same times units 1-12, and thus simultaneously, another "Element B" shutter of a second light-admitting element matrix opens and thereby exposes an underlying image sensor 204 cell over a shorter "Exposure #2" time comprising the first six time units (1 through 6), closes for the next two time units (7 and 8) for reading of the image data and resetting by purging of the underlying image sensor 204 cell, then again opens and exposes its underlying image sensor 204 cell over an even shorter "Exposure #3" time over a total of four time units (9 through 12). The third exposure data is then read and purged over subsequent time units 13 and 14.

Thus, three different images having the same color information are obtained over the three different shutter exposure times through overlapping exposures over the timeline 502, wherein the differences in the respective exposure time result in different levels of scene brightness in their images. In some embodiments the two matrices of shutter elements, and thus each of the three acquired images, are each associated with half of the available array sensors 204, each image thereby acquired at a cost of half of a total available resolution provided by a totality of the underlying sensors. However, a wide variety of element distributions may be practiced, and in other embodiments the discrete matrices may have unequal proportions of the available array sensors 204, so the images may be acquired with more or less than 50% of the available sensors.

Various image time signatures may also be practiced. In the present example, the elapsed time of Exposure #2 of six time units is more than one-half the total exposure time of Exposure #1, though it may be set to be one-half or any other portion, in one aspect also accounting for times required to transfer data and purge the underlying pixel cells. Also, in other arrangements, more than three images may be taken over the longer Exposure time #1 and read/reset time period.

Figure 6:
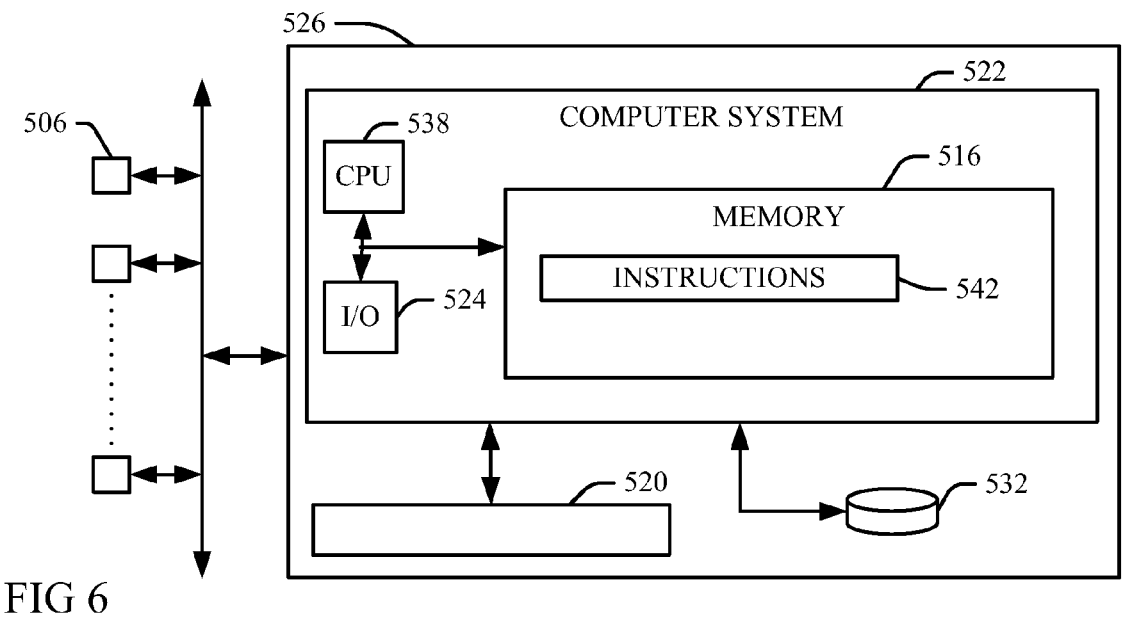
FIG. 6 is a block diagram illustration of a computerized implementation of an embodiment of the present invention.

Referring now to FIG. 6, an exemplary computerized implementation of an embodiment of the present invention includes computer or other programmable device 522 in communication with cameras or other imaging devices 506 (for example, video cameras or video servers, etc.). Instructions 542 reside within computer readable code in a computer readable memory 516, or in a computer readable storage system 532, Input/Output (I/O) 524 or other 506 device or other computer readable storage medium that is accessed through a computer network infrastructure 526 by a processing unit (CPU) 538. Thus, the instructions, when implemented by the processing unit (CPU) 538, cause the processing unit (CPU) 538 to use discrete matrices of light-admitting elements to obtain a plurality of different images at different levels of admitted/exposed light from a common exposure to a single array of image sensors as described above with respect to FIGS. 1 through 5.

Figure 7:
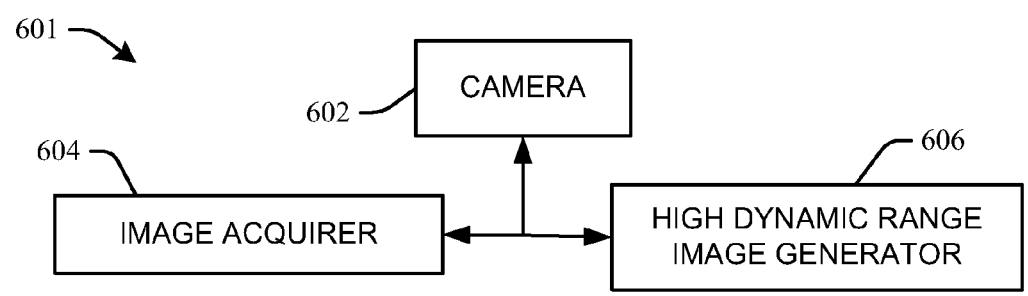
FIG. 7 is a block diagram illustration of an article according to the present invention.

FIG. 7 illustrates an article 601 (for example, a programmable device, system, etc.) according to the present invention that uses discrete matrices of light-admitting elements to obtain a plurality of different images at different levels of admitted/exposed light from a common exposure to a single array of image sensors as described above with respect to FIGS. 1 through 6. One or more of the components of the article 601 are tangible devices that perform specific functions, for example comprising the processing unit 538, the computer readable memory 516 and the computer readable storage medium 532 described above. Thus, as understood by reference to FIGS. 1-6 and the associated description material above, an Image Acquirer 604 in communication with discrete matrices of light-sensitive image sensors defined within a common array in a singular focal plane array of a Camera 602 acquires different images from each matrix from color image information transmitted by corresponding different matrices of light transmitter elements, wherein the images are at different levels of brightness of admitted/exposed light. The Image Acquirer 604 may control distinct active light-admitting elements in the Camera 602 matrices (for example, shutters) to effect the different levels of exposed light used to generate each of the different images through exposure settings in unison with respect to the associated sensor arrays (for example, active mechanically, electrically, chemically, etc.), or the light-admitting elements may be passive masks or filters. A High Dynamic Range (HDR) Image Generator 606 combines pixel data from the images acquired to produce a single high dynamic range image of the scene.

Embodiments of the present invention may also perform process steps of the invention on a subscription, advertising, and/or fee basis. That is, a service provider could offer to use discrete matrices of light-admitting elements to obtain a plurality of different images at different levels of admitted/exposed light from a common exposure to a single array of image sensors as described above with respect to FIGS. 1-7. Thus, the service provider can create, maintain, and support, etc., a computer infrastructure, such as the network computer system 522, network environment 526, and/or the article 601 (or parts thereof) that perform the process steps of the invention for one or more customers. In return, the service provider can receive payment from the customer(s) under a subscription and/or fee agreement and/or the service provider can receive payment from the sale of advertising content to one or more third parties. Services may comprise one or more of: (1) installing program code on a computing device, such as the computers/devices 522/601, from a computer-readable medium device 516, 520 or 506; (2) adding one or more computing devices to a computer infrastructure; and (3) incorporating and/or modifying one or more existing systems of the computer infrastructure to enable the computer infrastructure to perform the process steps of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for using a single array of pixels to obtain a plurality of different images at different levels of admitted exposure light from a common source level of exposure light, the method comprising:

exposing for an exposure time period first and second matrices of light-admitting elements deployed in a single camera to light from a scene image from a focal lens of the camera, wherein the first matrix of the light-admitting elements is disposed relative to the focal lens light in front of a corresponding first matrix of pixels arrayed in a singular focal plane array in the camera and in circuit communication with a processing unit, and wherein the second matrix of light-admitting elements is disposed relative to the focal lens light in front of a corresponding second matrix of pixels arrayed in the singular focal plane array and in circuit communication with the processing unit, and wherein the pixels of the corresponding first and second matrices of pixels react equally to equal levels of color image information in the exposed focal lens light;

the first matrix of light-admitting elements transmitting the color image information from the exposed focal lens light from the scene image to each pixel of the corresponding first matrix of pixels at a first level of brightness of the exposed light during the exposure time period;

the second matrix of light-admitting elements transmitting the color image information from the exposed focal lens light from the scene image to each pixel of the corresponding second matrix of pixels at a second level of brightness of the exposed light that is different than the first level of brightness;

acquiring a first image that has the first level of brightness from the color image information transmitted to the corresponding first matrix of pixels during the exposure time period;

acquiring a second image that has the second level of brightness from the color image information transmitted to the corresponding second matrix of pixels during the exposure time period; and combining via the processing unit pixel data from the acquired first and second images to produce a high dynamic range image of the scene; and wherein the first and the second matrices of light-admitting elements comprise pluralities of different color shade transparency masking elements each having different color shades and that each transmit color image information at a level of brightness of their respective color shades;

wherein the first matrix of light-admitting elements transmitting the color image information from the exposed focal lens light from the scene image to each pixel of the corresponding first matrix of pixels at the first level of brightness during the exposure time period comprises first light-admitting element matrix white masks transmitting white color image information to corresponding ones of the pixels of the corresponding first matrix of pixels at a first level of white-light brightness, first light-admitting element matrix red masks transmitting red color image information to corresponding ones of the pixels of the corresponding first matrix of pixels at a first level of red-light brightness, first light-admitting element matrix blue masks transmitting blue color image information to corresponding ones of the pixels of the corresponding first matrix of pixels at a first level of blue-light brightness, and first light-admitting element matrix green masks transmitting green color image information to corresponding ones of the pixels of the corresponding first matrix of pixels at a first level of green-light brightness; and wherein the second matrix of light-admitting elements transmitting the color image information from the exposed focal lens light from the scene image to each pixel of the corresponding second matrix of pixels at the second level of brightness during the exposure time period comprises second light-admitting element matrix dark white masks transmitting the white color image information to corresponding ones of the pixels of the corresponding second matrix of pixels at a second level of white-light brightness that is different than the first level of white-light brightness, second light-admitting element matrix dark red masks transmitting the red color image information to corresponding ones of the pixels of the corresponding second matrix of pixels at a second level of red-light brightness that is different than the first level of red-light brightness, second light-admitting element matrix dark blue masks transmitting the blue color image information to corresponding ones of the pixels of the corresponding second matrix of pixels at a second level of blue-light brightness that is different than the first level of blue-light brightness, and second light-admitting element matrix dark green masks transmitting the green color image information to corresponding ones of the pixels of the corresponding second matrix of pixels at a second level of green-light brightness that is different than the first level of green-light brightness.

2. The method of claim 1, wherein the corresponding first and second matrices of pixels each comprise one-half of an aggregate total of the pixels of the corresponding first and second matrices of pixels in the singular focal plane array, and wherein the first image and the second image each have a resolution of one-half of a total image resolution of the aggregate total of the pixels of the corresponding first and second matrices of pixels in the singular focal plane array.

3. The method of claim 1, wherein the light-admitting elements of the first and the second matrices of light-admitting elements are each disposed over one each of the pixels of the corresponding first and second matrices of pixels in a one-to-one relationship.

4. A method for using a single array of pixels to obtain a plurality of different images at different levels of admitted exposure light from a common source level of exposure light, the method comprising:

exposing for an exposure time period first and second matrices of light-admitting elements deployed in a single camera to light from a scene image from a focal lens of the camera, wherein the first matrix of the light-admitting elements is disposed relative to the focal lens light in front of a corresponding first matrix of pixels arrayed in a singular focal plane array in the camera and in circuit communication with a processing unit, and wherein the second matrix of light-admitting elements is disposed relative to the focal lens light in front of a corresponding second matrix of pixels arrayed in the singular focal plane array and in circuit communication with the processing unit, and wherein the pixels of the corresponding first and second matrices of pixels react equally to equal levels of color image information in the exposed focal lens light;

the first matrix of light-admitting elements transmitting the color image information from the exposed focal lens light from the scene image to each pixel of the corresponding first matrix of pixels at a first level of brightness of the exposed light during the exposure time period;

the second matrix of light-admitting elements transmitting the color image information from the exposed focal lens light from the scene image to each pixel of the corresponding second matrix of pixels at a second level of brightness of the exposed light that is different than the first level of brightness;

acquiring a first image that has the first level of brightness from the color image information transmitted to the corresponding first matrix of pixels during the exposure time period;

acquiring a second image that has the second level of brightness from the color image information transmitted to the corresponding second matrix of pixels during the exposure time period; and combining via the processing unit pixel data from the acquired first and second images to produce a high dynamic range image of the scene; and wherein each of the light-admitting elements of the first and the second light-admitting elements are shutters;

wherein the first matrix of light-admitting element shutters transmitting the color image information from the exposed focal lens light from the scene image to each pixel of the corresponding first matrix of pixels at the first level of brightness comprises the light-admitting element shutters of the first matrix of light-admitting element shutters opening for a first matrix shutter time during the exposure time period and thereby transmitting the color image information to corresponding ones of the pixels of the corresponding first matrix of pixels at the first level of brightness during the exposure time period; and wherein the second matrix of light-admitting element shutters transmitting the color image information from the exposed focal lens light from the scene image to each pixel of the corresponding second matrix of light-sensitive image sensors at the second level of brightness comprises the light-admitting element shutters of the second matrix of light-admitting element shutters opening for a second matrix shutter time during the exposure time period that is shorter than the first matrix shutter time and thereby transmitting the color image information to corresponding ones of the pixels of the corresponding second matrix of pixels at the second level of brightness during the exposure time period; and purging the color image information transmitted to the corresponding second matrix of pixels by the second matrix of light-admitting element shutters opened for the second matrix shutter time during the exposure time period and used in the acquiring of the second image;

the second matrix of light-admitting element shutters reopening for another matrix shutter time during the exposure time period and transmitting the color image information from the exposed focal lens light from the scene image to said each pixel of the corresponding second matrix of pixels at a reopening level of brightness;

acquiring another image at the reopening level of brightness from the color image information transmitted to the corresponding second matrix of pixels during the reopening of the second matrix of light-admitting element shutters for the another matrix shutter time during the exposure time period; and wherein the combining the pixel data from the acquired first and second images to produce the single high dynamic range image of the scene further comprises combining pixel data from the first, the second and the another images to produce the single high dynamic range image of the scene.

5. The method of claim 4, wherein each of the first, the second and the another images have a resolution of one-half of a total image resolution of an aggregate total of the pixels of the corresponding first and second matrices of pixels in the singular focal plane array.

6. The method of claim 1, wherein the corresponding first matrix of pixels comprises more or less than one-half of an aggregate total of the pixels of the corresponding first and second matrices of pixels in the singular focal plane array, and wherein the first image has a percentage resolution of a total image resolution of the aggregate total of the pixels of the corresponding first and second matrices of pixels in the singular focal plane array equal to a percentage total of the corresponding first matrix of pixels relative to the aggregate total of the pixels of the corresponding first and second matrices of pixels.

7. The method of claim 6, wherein the corresponding first matrix of pixels comprises 75% of the aggregate total of the pixels of the corresponding first and second matrices of pixels in the singular focal plane array, and the second matrix of pixels comprises 25% of the aggregate total of the pixels of the corresponding first and second matrices of pixels in the singular focal plane array.

8. A method of providing a service for using a single array of pixels to obtain a plurality of different images at different levels of admitted exposure light from a common source level of exposure light, the method comprising providing:

an image acquirer that acquires a first image that has a first level of brightness from color image information transmitted to a first matrix of pixels by a corresponding first matrix of light-admitting elements during an exposure time period from exposed focal lens light from a scene image, wherein each light-admitting element of the first matrix of light-admitting elements is disposed relative to the focal lens light in front of a corresponding pixel of the first matrix of pixels, and wherein the first matrix of pixels is arrayed in a singular focal plane array in a camera; and wherein the image acquirer further acquires a second image that has a second level of brightness from the color image information transmitted to a second matrix of pixels by a corresponding second matrix of light-admitting elements during the exposure time period from the exposed focal lens light from the scene image, wherein each light-admitting element of the second matrix of light-admitting elements is disposed relative to the focal lens light in front of a corresponding pixel of the second matrix of pixels, wherein the second matrix of pixels is arrayed in the singular focal plane array in the camera, wherein the pixels in the first and second matrices of pixels react equally to equal levels of color image information in the exposed focal lens light, and wherein the second level of brightness is different from the first level of brightness; and a high dynamic range image generator that combines pixel data from the acquired first and second images to produce a high dynamic range image of the scene; and wherein the first and the second matrices of light-admitting elements comprise pluralities of different color shade transparency masking elements each having different color shades and that each transmit color image information at a level of brightness of their respective color shades;

wherein the first matrix of light-admitting elements comprises first light-admitting element matrix white masks transmitting white color image information to corresponding ones of the pixels of the corresponding first matrix of pixels at a first level of white-light brightness, first light-admitting element matrix red masks transmitting red color image information to corresponding ones of the pixels of the corresponding first matrix of pixels at a first level of red-light brightness, first light-admitting element matrix blue masks transmitting blue color image information to corresponding ones of the pixels of the corresponding first matrix of pixels at a first level of blue-light brightness, and first light-admitting element matrix green masks transmitting green color image information to corresponding ones of the pixels of the corresponding first matrix of pixels at a first level of green-light brightness; and wherein the second matrix of light-admitting elements comprises second light-admitting element matrix dark white masks transmitting the white color image information to corresponding ones of the pixels of the corresponding second matrix of pixels at a second level of white-light brightness that is different than the first level of white-light brightness, second light-admitting element matrix dark red masks transmitting the red color image information to corresponding ones of the pixels of the corresponding second matrix of pixels at a second level of red-light brightness that is different than the first level of red-light brightness, second light-admitting element matrix dark blue masks transmitting the blue color image information to corresponding ones of the pixels of the corresponding second matrix of pixels at a second level of blue-light brightness that is different than the first level of blue-light brightness, and second light-admitting element matrix dark green masks transmitting the green color image information to corresponding ones of the pixels of the corresponding second matrix of pixels at a second level of green-light brightness that is different than the first level of green-light brightness.

9. A method of providing a service for using a single array of pixels to obtain a plurality of different images at different levels of admitted exposure light from a common source level of exposure light, the method comprising providing:

an image acquirer that acquires a first image that has a first level of brightness from color image information transmitted to a first matrix of pixels by a corresponding first matrix of light-admitting elements during an exposure time period from exposed focal lens light from a scene image, wherein each light-admitting element of the first matrix of light-admitting elements is disposed relative to the focal lens light in front of a corresponding pixel of the first matrix of pixels, and wherein the first matrix of pixels is arrayed in a singular focal plane array in a camera; and wherein the image acquirer further acquires a second image that has a second level of brightness from the color image information transmitted to a second matrix of pixels by a corresponding second matrix of light-admitting elements during the exposure time period from the exposed focal lens light from the scene image, wherein each light-admitting element of the second matrix of light-admitting elements is disposed relative to the focal lens light in front of a corresponding pixel of the second matrix of pixels, wherein the second matrix of pixels is arrayed in the singular focal plane array in the camera, wherein the pixels in the first and second matrices of pixels react equally to equal levels of color image information in the exposed focal lens light, and wherein the second level of brightness is different from the first level of brightness; and a high dynamic range image generator that combines pixel data from the acquired first and second images to produce a high dynamic range image of the scene; and wherein each light-admitting element of the first and the second matrices of light-admitting elements are shutters, and wherein the image acquirer further:

opens the first matrix of light-admitting element shutters for a first shutter time during the exposure time period, wherein the light-admitting element shutters of the first matrix of light-admitting element shutters thereby transmit the color image information to corresponding ones of pixels of the first matrix of pixels at the first level of brightness during the exposure time period; and opens the second matrix of light-admitting element shutters for a second shutter time during the exposure time period that is different from the first shutter time, wherein the light-admitting element shutters of the second matrix of light-admitting element shutters thereby transmit the color image information to corresponding ones of pixels of the second matrix of pixels at the different second level of brightness during the exposure time period; and purging the color image information transmitted to the corresponding second matrix of pixels by the second matrix of light-admitting element shutters opened for the second matrix shutter time during the exposure time period and used in the acquiring of the second image;

the second matrix of light-admitting element shutters reopening for another matrix shutter time during the exposure time period and transmitting the color image information from the exposed focal lens light from the scene image to said each pixel of the corresponding second matrix of pixels at a reopening level of brightness;

wherein the image acquirer further acquires another image at the reopening level of brightness from the color image information transmitted to the corresponding second matrix of pixels during the reopening of the second matrix of light-admitting element shutters for the another matrix shutter time during the exposure time period; and wherein the combining the pixel data from the acquired first and second images to produce the single high dynamic range image of the scene further comprises combining pixel data from the first, the second and the another images to produce the single high dynamic range image of the scene.

10. The method of claim 8, wherein the first matrix of pixels comprises more or less than one-half of an aggregate total of the pixels of the first and second matrices of pixels in the singular focal plane array, and wherein the first image has a percentage resolution of a total image resolution of the aggregate total of the pixels of the first and second matrices of pixels in the singular focal plane array equal to a percentage total of the first matrix of pixels relative to the aggregate total of the pixels of the first and second matrices of pixels.

11. A system, comprising:

a processing unit, a computer readable memory and a computer-readable storage medium;

wherein the processing unit, when executing program instructions stored on the computer-readable storage medium via the computer readable memory:

acquires a first image that has a first level of brightness from color image information transmitted to a first matrix of pixels by a corresponding first matrix of light-admitting elements during an exposure time period from exposed focal lens light from a scene image, wherein each light-admitting element of the first matrix of light-admitting elements is disposed relative to the focal lens light in front of a corresponding pixel of the first matrix of pixels, and wherein the first matrix of pixels is arrayed in a singular focal plane array in a camera;

acquires a second image that has a second level of brightness from the color image information transmitted to a second matrix of pixels by a corresponding second matrix of light-admitting elements during the exposure time period from the exposed focal lens light from the scene image, wherein each light-admitting element of the second matrix of light-admitting elements is disposed relative to the focal lens light in front of a corresponding pixel of the second matrix of pixels, wherein the second matrix of pixels is arrayed in the singular focal plane array in the camera, wherein the pixels in the first and second matrices of pixels react equally to equal levels of color image information in the exposed focal lens light, and wherein the second level of brightness is different from the first level of brightness; and combines pixel data from the acquired first and second images to produce a high dynamic range image of the scene; and wherein the first and the second matrices of light-admitting elements comprise pluralities of different color shade transparency masking elements each having different color shades and that each transmit color image information at a level of brightness of their respective color shades;

wherein the first matrix of light-admitting elements comprises first light-admitting element matrix white masks transmitting white color image information to corresponding ones of the pixels of the corresponding first matrix of pixels at a first level of white-light brightness, first light-admitting element matrix red masks transmitting red color image information to corresponding ones of the pixels of the corresponding first matrix of pixels at a first level of red-light brightness, first light-admitting element matrix blue masks transmitting blue color image information to corresponding ones of the pixels of the corresponding first matrix of pixels at a first level of blue-light brightness, and first light-admitting element matrix green masks transmitting green color image information to corresponding ones of the pixels of the corresponding first matrix of pixels at a first level of green-light brightness; and wherein the second matrix of light-admitting elements comprises second light-admitting element matrix dark white masks transmitting the white color image information to corresponding ones of the pixels of the corresponding second matrix of pixels at a second level of white-light brightness that is different than the first level of white-light brightness, second light-admitting element matrix dark red masks transmitting the red color image information to corresponding ones of the pixels of the corresponding second matrix of pixels at a second level of red-light brightness that is different than the first level of red-light brightness, second light-admitting element matrix dark blue masks transmitting the blue color image information to corresponding ones of the pixels of the corresponding second matrix of pixels at a second level of blue-light brightness that is different than the first level of blue-light brightness, and second light-admitting element matrix dark green masks transmitting the green color image information to corresponding ones of the pixels of the corresponding second matrix of pixels at a second level of green-light brightness that is different than the first level of green-light brightness.

12. A system, comprising:

a processing unit, a computer readable memory and a computer-readable storage medium;

wherein the processing unit, when executing program instructions stored on the computer-readable storage medium via the computer readable memory;

acquires a first image that has a first level of brightness from color image information transmitted to a first matrix of pixels by a corresponding first matrix of light-admitting elements during an exposure time period from exposed focal lens light from a scene image, wherein each light-admitting element of the first matrix of light-admitting elements is disposed relative to the focal lens light in front of a corresponding pixel of the first matrix of pixels, and wherein the first matrix of pixels is arrayed in a singular focal plane array in a camera;

acquires a second image that has a second level of brightness from the color image information transmitted to a second matrix of pixels by a corresponding second matrix of light-admitting elements during the exposure time period from the exposed focal lens light from the scene image, wherein each light-admitting element of the second matrix of light-admitting elements is disposed relative to the focal lens light in front of a corresponding pixel of the second matrix of pixels, wherein the second matrix of pixels is arrayed in the singular focal plane array in the camera, wherein the pixels in the first and second matrices of pixels react equally to equal levels of color image information in the exposed focal lens light, and wherein the second level of brightness is different from the first level of brightness; and combines pixel data from the acquired first and second images to produce a high dynamic range image of the scene; and wherein each light-admitting element of the first and the second matrices of light-admitting elements are shutters, and wherein the processing unit, when executing the program instructions stored on the computer-readable storage medium via the computer readable memory, further:

opens the first matrix of light-admitting element shutters for a first shutter time during the exposure time period, wherein the light-admitting element shutters of the first matrix of light-admitting element shutters thereby transmit the color image information to corresponding ones of pixels of the first matrix of pixels at the first level of brightness during the exposure time period; and opens the second matrix of light-admitting element shutters for a second shutter time during the exposure time period that is different from the first shutter time, wherein the light-admitting element shutters of the second matrix of light-admitting element shutters thereby transmit the color image information to corresponding ones of pixels of the second matrix of pixels at the different second level of brightness during the exposure time period; and purging the color image information transmitted to the corresponding second matrix of pixels by the second matrix of light-admitting element shutters opened for the second matrix shutter time during the exposure time period and used in the acquiring of the second image;

the second matrix of light-admitting element shutters reopening for another matrix shutter time during the exposure time period and transmitting the color image information from the exposed focal lens light from the scene image to said each pixel of the corresponding second matrix of pixels at a reopening level of brightness;

acquiring another image at the reopening level of brightness from the color image information transmitted to the corresponding second matrix of pixels during the reopening of the second matrix of light-admitting element shutters for the another matrix shutter time during the exposure time period; and wherein the combining the pixel data from the acquired first and second images to produce the single high dynamic range image of the scene further comprises combining pixel data from the first, the second and the another images to produce the single high dynamic range image of the scene.

13. The system of claim 11, wherein the light-admitting elements of the first and the second matrices of light-admitting elements are each disposed over one each of the pixels of the first and second matrices of pixels in a one-to-one relationship; and wherein the first and second matrices of the pixels each comprise one-half of an aggregate total of the pixels of the first and second matrices of pixels in the singular focal plane array, and wherein the first image and second image each have a resolution of one-half of a total image resolution of the aggregate total of the pixels of the first and second matrices of pixels in the singular focal plane array.

14. The system of claim 11, wherein the first matrix of pixels comprises more or less than one-half of an aggregate total of the pixels of the first and second matrices of pixels in the singular focal plane array, and wherein the first image has a percentage resolution of a total image resolution of the aggregate total of the pixels of the first and second matrices of pixels in the singular focal plane array equal to a percentage total of the first matrix of pixels relative to the aggregate total of the pixels of the first and second matrices of pixels.

15. An article of manufacture comprising:

a non-transitory computer-readable storage medium having computer readable program code embodied therewith, the computer readable program code comprising instructions that, when executed by a computer processor, cause the computer processor to:

acquire a first image that has a first level of brightness from color image information transmitted to a first matrix of pixels by a corresponding first matrix of light-admitting elements during an exposure time period from exposed focal lens light from a scene image, wherein each light-admitting element of the first matrix of light-admitting elements is disposed relative to the focal lens light in front of a corresponding pixel of the first matrix of pixels, and wherein the first matrix of pixels is arrayed in a singular focal plane array in a camera;

acquire a second image that has a second level of brightness from the color image information transmitted to a second matrix of pixels by a corresponding second matrix of light-admitting elements during the exposure time period from the exposed focal lens light from the scene image, wherein each light-admitting element of the second matrix of light-admitting elements is disposed relative to the focal lens light in front of a corresponding pixel of the second matrix of pixels, wherein the second matrix of pixels is arrayed in the singular focal plane array in the camera, wherein the pixels in the first and second matrices of pixels react equally to equal levels of color image information in the exposed focal lens light, and wherein the second level of brightness is different from the first level of brightness; and combines pixel data from the acquired first and second images to produce a high dynamic range image of the scene; and wherein the first and the second matrices of light-admitting elements comprise pluralities of different color shade transparency masking elements each having different color shades and that each transmit color image information at a level of brightness of their respective color shades;

wherein the first matrix of light-admitting elements comprises first light-admitting element matrix white masks transmitting white color image information to corresponding ones of the pixels of the corresponding first matrix of pixels at a first level of white-light brightness, first light-admitting element matrix red masks transmitting red color image information to corresponding ones of the pixels of the corresponding first matrix of pixels at a first level of red-light brightness, first light-admitting element matrix blue masks transmitting blue color image information to corresponding ones of the pixels of the corresponding first matrix of pixels at a first level of blue-light brightness, and first light-admitting element matrix green masks transmitting green color image information to corresponding ones of the pixels of the corresponding first matrix of pixels at a first level of green-light brightness; and wherein the second matrix of light-admitting elements comprises second light-admitting element matrix dark white masks transmitting the white color image information to corresponding ones of the pixels of the corresponding second matrix of pixels at a second level of white-light brightness that is different than the first level of white-light brightness, second light-admitting element matrix dark red masks transmitting the red color image information to corresponding ones of the pixels of the corresponding second matrix of pixels at a second level of red-light brightness that is different than the first level of red-light brightness, second light-admitting element matrix dark blue masks transmitting the blue color image information to corresponding ones of the pixels of the corresponding second matrix of pixels at a second level of blue-light brightness that is different than the first level of blue-light brightness, and second light-admitting element matrix dark green masks transmitting the green color image information to corresponding ones of the pixels of the corresponding second matrix of pixels at a second level of green-light brightness that is different than the first level of green-light brightness.

16. An article of manufacture comprising:

a non-transitory computer-readable storage medium having computer readable program code embodied therewith, the computer readable program code comprising instructions that, when executed by a computer processor, cause the computer processor to:

acquire a first image that has a first level of brightness from color image information transmitted to a first matrix of pixels by a corresponding first matrix of light-admitting elements during an exposure time period from exposed focal lens light from a scene image, wherein each light-admitting element of the first matrix of light-admitting elements is disposed relative to the focal lens light in front of a corresponding pixel of the first matrix of pixels, and wherein the first matrix of pixels is arrayed in a singular focal plane array in a camera;

acquire a second image that has a second level of brightness from the color image information transmitted to a second matrix of pixels by a corresponding second matrix of light-admitting elements during the exposure time period from the exposed focal lens light from the scene image, wherein each light-admitting element of the second matrix of light-admitting elements is disposed relative to the focal lens light in front of a corresponding pixel of the second matrix of pixels, wherein the second matrix of pixels is arrayed in the singular focal plane array in the camera, wherein the pixels in the first and second matrices of pixels react equally to equal levels of color image information in the exposed focal lens light, and wherein the second level of brightness is different from the first level of brightness; and combine pixel data from the acquired first and second images to produce a high dynamic range image of the scene; and wherein each light-admitting element of the first and the second matrices of light-admitting elements are shutters, and wherein the computer readable program code instructions when executed by the computer processor, further cause the computer processor to:

open the first matrix of light-admitting element shutters for a first shutter time during the exposure time period, wherein the light-admitting element shutters of the first matrix of light-admitting element shutters thereby transmit the color image information to corresponding ones of pixels of the first matrix of pixels at the first level of brightness during the exposure time period; and open the second matrix of light-admitting element shutters for a second shutter time during the exposure time period that is different from the first shutter time, wherein the light-admitting element shutters of the second matrix of light-admitting element shutters thereby transmit the color image information to corresponding ones of pixels of the second matrix of pixels at the different second level of brightness during the exposure time period; and purging the color image information transmitted to the corresponding second matrix of pixels by the second matrix of light-admitting element shutters opened for the second matrix shutter time during the exposure time period and used in the acquiring of the second image;

the second matrix of light-admitting element shutters reopening for another matrix shutter time during the exposure time period and transmitting the color image information from the exposed focal lens light from the scene image to said each pixel of the corresponding second matrix of pixels at a reopening level of brightness;

acquiring another image at the reopening level of brightness from the color image information transmitted to the corresponding second matrix of pixels during the reopening of the second matrix of light-admitting element shutters for the another matrix shutter time during the exposure time period; and wherein the combining the pixel data from the acquired first and second images to produce the single high dynamic range image of the scene further comprises combining pixel data from the first, the second and the another images to produce the single high dynamic range image of the scene.

17. The article of manufacture of claim 15, wherein the first matrix of pixels comprises more or less than one-half of an aggregate total of the pixels of the first and second matrices of pixels in the singular focal plane array, and wherein the first image has a percentage resolution of a total image resolution of the aggregate total of the pixels of the first and second matrices of pixels in the singular focal plane array equal to a percentage total of the first matrix of pixels relative to the aggregate total of the pixels of the first and second matrices of pixels.

* * * * *